US007455811B2

(12) United States Patent
Sjodin

(10) Patent No.: US 7,455,811 B2
(45) Date of Patent: Nov. 25, 2008

(54) BRAZING MATERIAL AND BRAZED PRODUCTS MANUFACTURED THEREWITH

(75) Inventor: Per Erik Sjodin, Lund (SE)

(73) Assignee: Alfa Laval Corporate AB, Tumba (SE)

( * ) Notice: Subject to any disclaimer, the term of this patent is extended or adjusted under 35 U.S.C. 154(b) by 0 days.

(21) Appl. No.: 10/479,815

(22) PCT Filed: Jun. 3, 2002

(86) PCT No.: PCT/SE02/01047

§ 371 (c)(1),
(2), (4) Date: Apr. 27, 2004

(87) PCT Pub. No.: WO02/098600

PCT Pub. Date: Dec. 12, 2002

(65) Prior Publication Data

US 2004/0184945 A1 Sep. 23, 2004

(30) Foreign Application Priority Data

Jun. 5, 2001 (SE) .................................. 0102010

(51) Int. Cl.
| C22C 38/22 | (2006.01) |
| C22C 38/32 | (2006.01) |
| C22C 38/34 | (2006.01) |
| C22C 38/38 | (2006.01) |
| C22C 38/44 | (2006.01) |
| C22C 38/54 | (2006.01) |

(52) U.S. Cl. ............................. 420/42; 420/50; 420/51; 420/52; 420/53; 420/54; 420/56; 420/57; 420/59; 420/64; 420/65; 420/66; 428/685; 75/255; 148/403; 219/146.23; 219/146.41

(58) Field of Classification Search ................. 148/325, 148/403, 327; 420/50, 64, 98, 117, 42, 65; 75/255, 246; 428/682–685; 219/146.23, 219/146.41

See application file for complete search history.

(56) References Cited

U.S. PATENT DOCUMENTS

| 4,410,604 | A |   | 10/1983 | Pohlman et al. |
| 4,444,587 | A | * | 4/1984 | Kelly ........................... 420/44 |
| 5,919,577 | A | * | 7/1999 | Hasegawa et al. ........... 428/606 |

FOREIGN PATENT DOCUMENTS

| JP |   55148701 | A |   | 11/1980 |
| JP |  357085953 |   | * | 5/1982 .................. 75/246 |
| JP |   61-052302 |   | * | 3/1986 |
| JP |   62081288 | A |   | 4/1987 |
| JP |   62183994 | A |   | 8/1987 |
| JP |   62227595 | A |   | 10/1987 |
| JP |    1205898 | A |   | 8/1989 |
| JP |    2101148 | A |   | 4/1990 |
| JP |    3086367 | A |   | 4/1991 |
| JP |  405293524 |   | * | 11/1993 |

OTHER PUBLICATIONS

Amir Shirzadi, Diffusion Bonding, http://www.msm.cam.ac.uk/phase-trans/2005/Amir/bond.html, University of Cambridge, printed on Apr. 2, 2008, 10 pages.

* cited by examiner

Primary Examiner—Deborah Yee
(74) Attorney, Agent, or Firm—Michaud-Duffy Group LLP

(57) ABSTRACT

An iron based brazing material for joining objects by brazing represents an alloy, which apart from iron contains approximately 9-30% Cr, approximately 0-8% Mn, approximately 0-25% Ni, 0-1% N, a maximum of 7% Mo, less than about 6% Si, approximately 0-2% B and/or about 0-15% P, all stated in weight percent, which addition of Si, P, and B in combination or separately lowers the liquidus temperature, that is the temperature at which the brazing material is completely melted. A brazed product is manufactured by brazing of iron based objects with an iron based brazing material which is alloyed with a liquidus lowering element as Si, P and B.

18 Claims, No Drawings

BRAZING MATERIAL AND BRAZED PRODUCTS MANUFACTURED THEREWITH

CROSS-REFERENCE TO RELATED APPLICATIONS

This application is entitled to the benefit of and incorporates by reference essential subject matter disclosed in International Application No. PCT/SE02/01047 filed on Jun. 3, 2002 and Swedish Patent Application No. 0102010.6 filed on Jun. 5, 2001.

FIELD OF THE INVENTION

The present invention relates to an iron based brazing material for joining objects by brazing. The invention also comprises a brazed product manufactured by brazing of objects of an iron based material with an iron based brazing material according to the invention.

BACKGROUND OF THE INVENTION

Different steel or iron based materials are usually joined by brazing with Ni-, Ag- or Cu-brazing materials.

Brazing is a process for tightening/joining, at which the temperature is lower than the solidus temperature of the base material of the objects which are to be joined together/tightened.

Brazing materials consist of material for joining and tightening, which completely or partly melt during the brazing process.

U.S. Pat. No. 4,135,656 relates to a Ni-based alloy which contains, counted as percentage by weight, 19-23% Mn, 5-8% Si, 4-6% Cu, 0.6-1.8% B and balance with Ni apart from smaller amounts of other elements. U.S. Pat. No. 4,314,661 describes another kind of Ni-based alloy which contains, given as a percentage of atoms 0-4% Fe, 0-21% Cr, 0-19% B, 0-12% Si, 0-22% P and balance with Ni.

When brazing with Cu one generally uses pure or almost pure Cu. The pure copper brazing material has a well defined melting point, while nickel brazing materials depending on the fact that they are alloys often have a melting interval.

When joining plates of stainless steel in plate heat exchanger copper brazing materials are often used. Copper is however not suitable for all kinds of applications. The use of brazing materials of copper for food applications is not allowed, but it is used in plate heat exchangers for district heating and for tap water installations.

Heat exchangers joined with brazing material of nickel are used in man applications and are also allowed for a limited number of food applications.

If brazing materials containing nickel alloys are used for joining objects of iron or non nickel-based materials, the composition of the brazed joints differs significantly from the composition of the materials, which are joined. This can result in undesired differences in the chemical and mechanical properties.

SUMMARY OF THE INVENTION

The present invention offers possibility to join objects by means of brazing by using a brazing material with mainly the same composition as the base material used for producing the product, at which the brazing material contains additive elements which lower its liquidus temperature. Consequently, the present invention offers a possibility to produce an apparatus as a plate heat exchanger, which is compatible with food application requirements by using a brazing material according to the invention.

DETAILED DESCRIPTION OF THE PREFERRED EMBODIMENTS

The invention is mainly characterized in that the brazing material consists of an alloy which apart from iron contains 9-30% Cr, 0-8% Mn, preferably 0-5% Mn, 0-25% Ni, 0-1% N and maximally 7% Mo and below 6% Si and/or 0-15% P and 0-2% B, preferably 0-1.5% B all stated as weight percent, which addition of Si, P and B lower the liquidus temperature, that is the temperature when the brazing material has melted completely. The melting point lowering elements are present in to the brazing material prior to brazing in amounts according to the following formula: Index=% P+1.1×% Si+3×% B, where the value of the Index should be 4.5-18.

The iron content in the brazing material is suitably at least 50%. The brazing material according to the invention must always contain Fe and Cr.

The effective, working amount of B and/or P and/or Si should lie in the interval given above in order to obtain the desired lowering of the melting point. The analysed amount of Si may however be considerably higher, since Si may occur for example in the state of silicon carbides or silicon nitrides, be bonded to oxygen or sintered in some other way. For the same reason the analysed amount of B or P may be higher.

The iron based brazing material may contain alloying elements as Ti, W, Al, Cu, Nb, Ta, V and others. Variations in composition may also be a consequence of small inevitable amounts of contaminating elements as C, O and S.

Melting point lowering elements are advantageously added to the brazing material in amounts according to the following formula Index=% P+1.1×% Si+3×% B, where the value of the Index should be 4.5-18.

The iron based brazing material is with advantage produced by gas- or water atomisation of an ingot with a composition as mentioned above or crushing such an ingot. Another alternative method for manufacture is melt spinning.

The invention also comprises a brazed product produced by brazing together iron based objects, by which the product is characterized by the joining of the objects with an iron based brazing material which is an alloy containing liquidus lowering elements as B and/or P and/or Si. The composition of the iron based brazing material is with advantage the composition as stated in the main claim.

Both the iron based objects in the brazed product and the iron based brazing material advantageously contain 9-30% Cr.

The brazed product is with advantage a brazed plate heat exchanger intended for at least two heat exchanging fluids which comprises at least one plate package manufactured by brazing together a number of thin walled heat exchanging plates of an iron based material by means of an iron based brazing material. The heat exchanging plates define between themselves plate inter spaces intended for the heat exchanging fluids. The brazing joints obtained have a metallurgical composition close to the composition of the iron based brazing material with locally higher amounts of Si, P, B in and around the brazing joints in comparison with the iron based plate material.

For brazing of iron based materials one has traditionally used Cu- or Ni-brazing materials as mentioned earlier. Surprisingly, it has now been found that one may start with a base material with the same composition as the material in the objects one desires to join. By alloying such a material with silicon and/or boron and/or phosphorous one may obtain well functioning brazing materials. By studying binary phase diagrams for pure iron and Si, B and P one may find that a Fe—Si alloy has a melting point minimum of 1212° C. for about 19% Si. For a Fe—B alloy there is a melting minimum at about 1174° C. at about 4% B. In the Fe—P-system there is a melting minimum at about 1048° C. at about 10% P.

In most cases pure iron materials are not used but instead alloys are used, which apart from Fe also contains relatively large amounts of Cr and Ni. In many alloys there are also Mo and Mn. To try to theoretically establish the effect of addition of different amounts of boron and/or phosphorous and/or silicon to such alloys by using phase diagrams is almost impossible, since the number of dimensions will be as large as the number of elements in the alloy.

In order to obtain a brazing joint the liquidus temperature of the brazing material should be below 1230° C., preferably below 1200° C.

Surprisingly enough it has been found that an addition of a relatively low amount of silicon, boron or phosphorous in combination or alone may give such a lowering of the liquidus temperature that a suitable brazing material may be obtained.

In the table below different examples of compositions of brazing material according to the invention are given.

TABLE 1

Analysis of the composition of some melts

| Melt | Fe | % Cr | % Mn | % Ni | % Mo | % Si | % B | % P | % C | Index |
|---|---|---|---|---|---|---|---|---|---|---|
| 1 | Bal | 16.8 | 1.5 | 11.8 | 2.2 | 4.4 | 0.5 | 6.1 | 0.1 | 12.4 |
| 2 | Bal | 16.7 | 3.7 | 11.7 | 1.9 | 1.0 | 0 | 10.6 | 0.1 | 11.7 |
| 3 | Bal | 17.0 | 1.8 | 12.1 | 2.1 | 1.0 | 0 | 10.1 | 0.1 | 11.2 |
| 4 | Bal | 17.1 | 3.0 | 12.0 | 2.2 | 4.7 | 0 | 6.0 | 0.1 | 11.2 |
| 5 | Bal | 17.0 | 2.9 | 11.8 | 2.1 | 5.6 | 0 | 6.0 | 0.1 | 12.2 |

The expression Bal (balance) means that the remaining material in the melt consists of Fe.

The samples were brazed at a temperature of 1190° C. The result of the visual examination of the test brazing of the samples was that all samples had melted and brazing joints had been obtained, also mechanical strength was obtained for all joints.

The brazing material according to the invention is suitably made in the form of a powder or a foil. The powder may be manufactured by producing an ingot, which is thereafter crushed and milled. The brittle nature of the material is utilized by this manufacturing method. The disadvantages of ingot casting is that SUBS a certain risk for segregation may yield a non-homogenous material with a melting interval which is difficult to define or is broad. For smaller ingots and/or rapid cooling the risk for segregations is reduced. In ingot casting it is important to minimise the contact with air by using vacuum casting or casting with a shielding gas. As a consequence of the mechanical treatment the energy content of the brazing material increases and with that its reactivity.

Further manufacturing methods to produce a powder with a homogenous composition consist of water or gas atomising. The properties of the powder vary with the manufacturing method. The crushed and milled particles are angular and pointed, the water atomised are nodular and the gas atomised are almost spherical. This difference in particle shape gives the brazing material somewhat varying properties when used for brazing. By choosing different atomising methods and the extent of crushing/milling combined with screening, the distribution of the particle size may be controlled. In water atomising the oxygen content generally will be higher since water atomising takes place at a higher oxygen potential than gas atomising. A higher oxygen content may give rise to formation of oxides in the material which may have a negative influence on the mechanical properties of the brazing joints. The effective Si and/or P and B percentage in the brazing material will consequently be lower, which means that the melting interval will be displaced.

Manufacture of a foil by melt spinning from a metal melt takes place by letting the metal melt be cooled directly against a cold surface in such a way that a foil for example is formed. In normal continuous foil production the cold surface consists of a cold roll manufactured of copper or an copper alloy. It is also possible to obtain amorphous foils, in such cases boron is generally added.

The brazing material according to the invention may be applied on the places where one desires a brazing joint by means of different methods. A powder of brazing material manufactured by means of any of the described methods may be suspended in some binder in order to be applied in a suitable manner.

The invention claimed is:

1. An iron based brazing material for joining objects by brazing, comprising an iron-based alloy manufactured by one of gas atomization and water atomization, said iron-based alloy consisting of 9-30% Cr, 0-8% Mn, 2-25% Ni, approximately 0-1% N, and Mo present in a maximum of 7% Mo, 0-20% Hf, less than about 6% Si, and if B is present then B being present in an amount of about 0% to about 2% B, and P being present in an amount of about 1% to about 15% P, all stated in weight percent, which addition of P and at least one of Si and B lowers the liquidus temperature, that is the temperature at which the brazing material is melted, the melting point lowering elements being present in the brazing material prior to brazing in amounts according to the following formula: Index=% P+1.1×% Si+3×% B, wherein the value of the Index should be approximately 4.5-18, and wherein the brazing material contains at least one of C, O, and S as a contaminating element in a trace amount.

2. An iron based brazing material according to claim 1, wherein said approximately 0-2% B is approximately 0-1.5% B.

3. A brazed product manufactured by brazing of at least two iron based objects, wherein the objects are joined by an iron based brazing material comprising an iron-based alloy manufactured by one of gas atomization and water atomization, said iron-based alloy consisting of 9-30% Cr, approximately 0-8% Mn, 2-25% Ni, approximately 0-1% N, and Mo present in a maximum of 7% Mo, approximately 0-20% Hf, less than about 6% Si, and if B is present then B being present in an amount of about 0% to about 2% B, and P being present in an amount of about 1% to about 15% P, all stated in weight percent, which addition of P and at least one of Si and B lowers the liquidus temperature, that is the temperature at which the brazing material is melted, the melting point lowering elements being present in the brazing material prior to brazing in amounts according to the following formula: Index=% P+1.1×% Si+3×% B, where the value of the Index should be approximately 4.5-18, wherein the brazing material contains at least one of C, O, and S as a contaminating element in a trace amount, and wherein a brazing joint formed from the brazing material brazed onto at least two iron-based objects has a metallurgical composition close to the composition of the iron-based brazing material with higher amounts of P and Si in and around the brazing joint in comparison to the P and Si contained in the iron-based objects.

4. A brazed product according to claim 3, wherein both the iron base objects and the iron based brazing material contains approximately 9-30% Cr.

5. A brazed product according to claim 4, wherein the product is a plate heat exchanger intended for use with at least two heat exchanging fluids, the plate heat exchanger including at least one plate package manufactured by brazing together a number of thin walled heat exchanging plates of an iron based material brazed with the iron based brazing material, at which the heat exchanging plates between themselves define plate inter spaces intended for the heat exchanging fluids, at which the obtained brazing joints have a metallurgical composition close to the composition of the iron based plate material with locally higher amounts of Si, P and B in and around the brazing joints in comparison with the iron based plate material.

6. An iron based brazing material for joining objects by brazing, comprising an iron-based alloy manufactured by one of gas atomization and water atomization, said iron-based alloy consisting of 9-30% Cr, approximately 0-8% Mn, approximately 0-25% Ni, approximately 0-1% N, and Mo present in a maximum of 7% Mo, approximately 0-20% Hf, approximately 0.1 to about 6% Si, and if B is present then B being present in an amount of about 0% to about 2% B, and P being present in an amount of about 1% to about 15% P, all stated in weight percent, which addition of P and at least one of Si and B lowers the liquidus temperature, that is the temperature at which the brazing material is melted, the melting point lowering elements being present in the brazing material prior to brazing in amounts according to the following formula: Index=% P+1.1×% Si+3×% B, where the value of the Index should be approximately 4.5-18, and wherein the brazing material contains at least one of C, O, and S as a contaminating element in a trace amount.

7. An iron based brazing material according to claim 6, wherein said approximately 0-8% Mn is approximately 0-5% Mn.

8. An iron based brazing material according to claim 6, wherein said approximately 0-2% B is approximately 0-1.5% B.

9. An iron based brazing material as defined by claim 7, wherein said approximately 0-2% B is approximately 0-1.5% B.

10. An iron based brazing material according to claim 1, wherein the value of the Index is approximately 7-15.

11. An iron based brazing material according to claim 1, wherein P is present in an amount of about 2% to about 15% P, stated in weight percent.

12. An iron based brazing material according to claim 1, wherein Si is present in an amount of about 0.5% to less than about 6%.

13. A brazed product according to claim 3, wherein Si is present in an amount of about 0.5% to less than about 6%.

14. An iron based brazing material according to claim 6, wherein the value of the Index is approximately 7-15.

15. An iron based brazing material according to claim 6, wherein P is present in an amount of about 2% to about 15% P, stated in weight percent.

16. An iron based brazing material according to claim 6, wherein Si is present in an amount of about 0.5% to less than about 6%.

17. An iron-based brazing material according to claim 1, wherein said 0-8% Mn is approximately 0-5% Mn.

18. An iron-based brazing material according to claim 17, wherein said about 0-2% B is approximately 1-1.5% B.

\* \* \* \* \*